UNITED STATES PATENT OFFICE.

ALAN I. APPELBAUM, OF TRENTON, NEW JERSEY, ASSIGNOR TO THE IMPORT AND BY PRODUCTS COMPANY, INCORPORATED, OF TRENTON, NEW JERSEY, A CORPORATION OF DELAWARE.

SULFUR COLOR AND PROCESS OF MANUFACTURING THE SAME FROM ALOES.

1,346,154.   Specification of Letters Patent.   Patented July 13, 1920.

No Drawing.   Application filed February 5, 1919. Serial No. 275,243.

*To all whom it may concern:*

Be it known that I, ALAN I. APPELBAUM, a citizen of the United States, and a resident of Trenton, in the county of Mercer and State of New Jersey, have invented an Improvement in Sulfur Color and Processes of Manufacturing the Same from Aloes, of which the following is a specification.

In the manufacture of sulfur colors, the practice heretofore has been to employ coal tar intermediates which are expensive and costly. I have discovered that sulfur colors of equal fastness and desirability may be produced by the employment of aloes (also known as aloe resin) either before or after the extraction of the aloin therefrom. It is probable that the residue remaining after the extraction of the aloin usually will be employed, because such residual by-product is at the present time practically useless and of little value, but if preferred, the aloes, before such extraction has been effected, may be used. My invention comprehends the employment of aloes, both before and after the extraction of the aloin; and the term "aloes" as used herein is intended to include or comprehend the substance both before and after such extraction.

It is one object of my invention to cheapen the process employed in the manufacture of sulfur colors by the employment in the manufacture of the same of an ingredient, namely aloes, which may be obtained very cheaply and which has not heretofore been employed in the manufacture of such colors.

A further object of my invention is to vary the shades and hues of the colors produced by using aloes as a base in the manufacture of the same.

In the carrying out of my invention, I may employ a mixture of sulfur, caustic soda (sodium hydroxid), caustic potash (potassium hydroxid), caustic lime (calcium hydroxid), or any other suitable alkali compound, and aloes (either before or after the extraction of aloin therefrom) with water, and subject the same to certain treatment as hereinafter will be set forth; or I may employ a mixture of sulfur, aloes and sodium sulfid with water; or I may employ a mixture of aloes and sodium sulfid alone with water and subject the same to certain treatment as hereinafter will be set forth for the purpose of causing the same to combine to form the color sought.

Although not necessary, I may add to these mixtures a salt of certain metals, such as copper, iron, zinc, nickel, cobalt, cerium or other rare metals, or the metals themselves in a fine state of division, or a compound such as benzidin. The addition of one of these metallic salts or benzidin or a mixture of said salts or a mixture of benzidin and a salt or salts causes the production of a color of different shade and brighter hue.

Other objects and advantages of my invention will be referred to in the detailed description thereof which follows or will be apparent from such description.

In view of the fact that my invention is not dependent upon any particular form of apparatus, but may be carried out in any known form of apparatus used by manufacturers of sulfur colors or dyes at the present time, I do not deem it necessary to provide drawings illustrating an apparatus,—particularly as the apparatus employed consists only of a suitable digester in which the mixture of materials is treated.

In the carrying out of my invention, I may mix together caustic soda, caustic potash, caustic lime or other suitable alkali compound, sulfur and aloes in equal parts with four or five parts of water, and subject the same to a temperature sufficiently high to effect boiling of the same at atmospheric pressure, for a period of several hours. I have obtained the best results by maintaining such treatment during a continuous period of six or eight hours, although my invention is not limited to a treatment of that particular or exact length of time.

As previously suggested, I may also employ, instead of caustic soda, caustic potash or caustic lime, sodium, potassium, calcium or other suitable alkali sulfid, the latter and the aloes being mixed together in equal proportions, water being included in the mixture as above set forth.

I have also discovered that the process may be carried out by the mixing together of aloes, sulfur and sodium, potassium or calcium sulfid in equal proportions and four or five parts of water, the mixture being subjected to a heat sufficient to cause boiling of the same at atmospheric pressure for a length of time such as above suggested.

Although I have suggested that the ingredients mentioned above may be employed in equal portions (with the exception of water) I desire it to be understood that these proportions may be varied without departing from my invention. For instance, when a mixture of aloes, sodium sulfid, sulfur and water is employed, the quantity of sulfur used may be half of the quantity of sodium sulfid or of the aloes, and also the proportion of the water to the other ingredients may be varied.

The last example is given merely to show that the quantities of the respective materials employed may be varied through wide ranges without departing from my invention.

It may happen that a color of different shade and brighter hue than would be produced by employing the ingredients above described alone is desired. If this should be the case, the desired result may be produced by including in the mixture a salt of certain metals such as copper, iron, zinc, nickel, cobalt, cerium or other rare metals, or the metals themselves in a fine state of division or a mixture thereof, or certain compounds, such as benzidin, mixed with such salts.

The introduction of these substances causes the production of colors of different shade and brighter hue.

Instead of subjecting the mixture as above described to boiling temperature at atmospheric pressure, the said mixture may be heated under pressure greater than atmospheric pressure to such temperatures as may be desired. By varying the temperature at which the process is carried out, the color produced is varied, the higher the temperature employed in the process, the darker the color.

After the mixture shall have been subjected to a boiling temperature at atmospheric pressure for a period of six or eight hours, or if heated to the temperature desired under pressure greater than atmospheric pressure, for a period of two or three hours, the reaction will have been completed,—the mixture being in liquid form, which liquid is then withdrawn into a tank and treated with a dilute acid, such as sulfuric or hydrochloric acid, for the purpose of precipitating the dye or color, or precipitation of the dye or color may be effected by blowing air through said liquid.

The process constituting my invention may be defined generically as consisting in subjecting aloes to alkaline sulfur fusion. This statement is intended to comprehend the process of fusing aloes or aloes residue with sulfur or a sulfur compound in an alkaline medium.

After the dye or color has been precipitated, it is filter-pressed, washed, dried and ground in known manner and is then ready for use.

This application is filed as a continuation in part of my application, Serial No. 239,178, filed June 10, 1918.

I claim:

1. The process of producing a sulfur color which comprises mixing together aloes, sulfur, caustic soda and a metallic salt and benzidin and water and heating the said mixture to cause reactions between the ingredients thereof, forming a liquid and thereafter precipitating the color material from said liquid.

2. The process of producing a sulfur color which comprises mixing together aloes, sulfur and caustic soda and water and heating the same under a pressure greater than atmospheric pressure, thereafter dissolving the product thus produced in water and precipitating from the solution thus formed the color material.

3. The process of producing a sulfur color which comprises mixing together aloes, sulfur, alkali hydroxid and a metallic salt in the presence of water and heating the said mixture to cause re-action between the ingredients thereof, forming a liquid and thereafter precipitating the color material from said liquid.

In testimony that I claim the foregoing as my invention, I have hereunto set my hand this 30th day of Jan., A. D. 1919.

ALAN I. APPELBAUM.